A. J. SANGSTER.
NON-SLIPPABLE ATTACHMENT FOR HORSESHOES.
APPLICATION FILED DEC. 29, 1909.

962,471.

Patented June 28, 1910.

Witnesses:
C. E. Wessels.
B. G. Richards

Inventor:
Andrew J. Sangster,
By Joshua R. H. Potts
his Attorney.

UNITED STATES PATENT OFFICE.

ANDREW J. SANGSTER, OF CHICAGO, ILLINOIS.

NON-SLIPPABLE ATTACHMENT FOR HORSESHOES.

962,471.  Specification of Letters Patent.  Patented June 28, 1910.

Application filed December 29, 1909. Serial No. 535,509.

*To all whom it may concern:*

Be it known that I, ANDREW J. SANGSTER, a subject of the King of Great Britain, residing at Chicago, county of Cook, and State of Illinois, have invented certain new and useful Improvements in Non-Slippable Attachments for Horseshoes, of which the following is a specification.

My invention relates to improvements in non-slippable attachments for horse shoes and has for its object the production of an attachment which may be readily and securely applied to a horse's hoof and removed therefrom and which will prevent slipping of the feet of the horse.

The invention consists in the combination and arrangement of parts hereinafter described and claimed.

Figure 1:
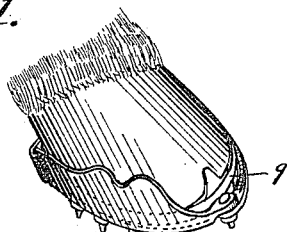
Figure 3:
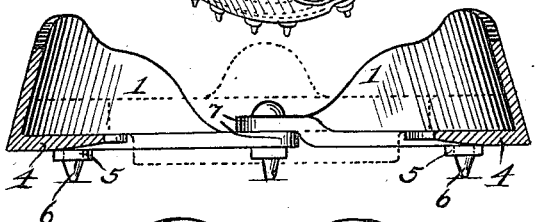
Figure 4:
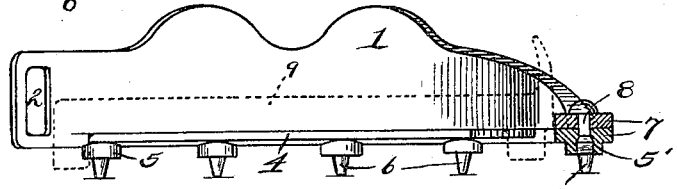
Figure 2:
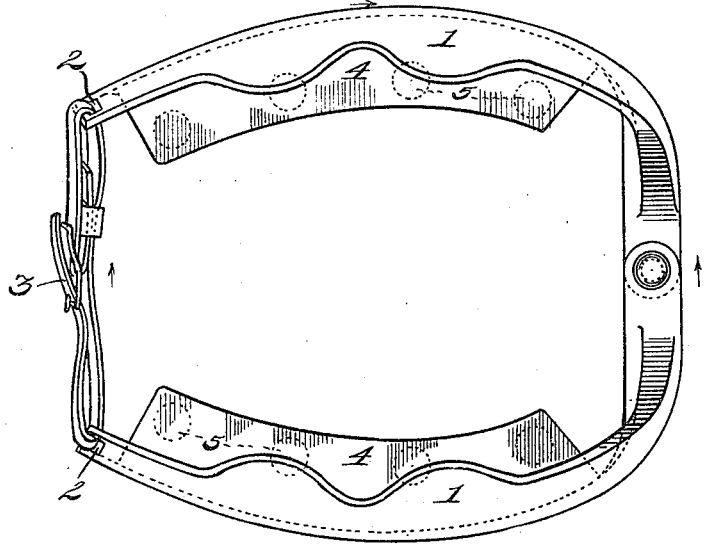
Figure 5:
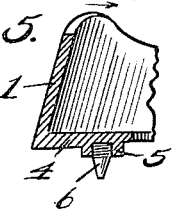

The invention will be more readily understood by reference to the accompanying drawings forming a part of this specification, and in which, Figure 1 is a perspective view of a horse hoof to which has been applied an attachment embodying my invention, Fig. 2, an enlarged top plan view of the attachment, Fig. 3, a transverse section of the attachment showing the ordinary horse shoe in dotted lines, Fig. 4, a longitudinal section of Fig. 3, and Fig. 5, a section illustrating the method of removably securing the calks to the attachment.

The preferred form of construction as illustrated in the drawings comprises two side members 1 hinged together at the front and provided at their rear ends with openings 2 adapted to receive a securing strap 3 for securing the attachment in position. Each of said side members 1 is provided with an inwardly extending flange 4 carrying downwardly extending threaded bosses 5 adapted to removably receive and secure threaded calks 6. At their front ends members 1 are provided with overlapping perforated eyes 7 the lower of which is provided with a downwardly extending threaded boss 5' adapted to receive a threaded calk 6. The eyes 7 are secured together by means of a rivet 8 let into boss 5' so as to permit the insertion of calk 6 therein, as shown, thus effecting the hinged joint above mentioned. The members 1 are preferably made of cast malleable iron and the calks 6 of hardened steel, although other materials might be used with good results.

In use the attachment is applied by placing members 1 around the regular horse shoe 9 with the hinge in front and flanges 4 passing under the bottoms of the horse shoe, and securing it in position by means of strap 3. It will be observed that members 1 are shaped to extend upwardly on the hoof a considerable distance above the horse shoe so as to better secure the same in position and protect the hoof.

By the construction above described the attachment may be readily and securely locked to the regular horse shoe or removed when desired.

While I have illustrated and described the preferred form of construction for carrying my invention into effect, this is capable of variation or modification without departing from the spirit of my invention. I therefore do not wish to be limited to the exact details of construction set forth but desire to avail myself of such variations and modifications as come within the scope of the appended claims.

Having described my invention what I claim as new and desire to secure by Letters Patent is:

1. A horse shoe attachment comprising two metallic clamping members adapted to embrace the sides of a horse shoe and provided with horizontally disposed overlapping eyes at their front portions, said eyes being provided with registering rivet holes the hole in the lower eye consisting of a smaller upper portion adapted to permit the passage of a rivet and a larger threaded lower portion adapted to receive a rivet head and a threaded calk; a rivet secured through said holes; a threaded calk secured in said threaded portion of the hole; an inwardly extending flange on each of said members, adapted to embrace the bottom of the corresponding side of the shoe; downwardly extending calks on said flanges; and detachable means for securing the rear ends of said members together, substantially as described.

2. A horse shoe attachment comprising two metallic clamping members adapted to embrace the sides of a horse shoe and provided with horizontally disposed overlapping eyes at their front portions, said eyes being provided with registering rivet holes, the hole in the lower eye consisting of a smaller upper portion adapted to permit the passage of a rivet and a larger threaded lower portion adapted to receive a rivet head and a threaded calk, there being openings in the rear ends of said side members for the reception of a securing strap; a threaded calk secured in said threaded portion of the hole; an inwardly extending flange on each of said side members, adapted to embrace the bottom of the corresponding side of the shoe; downwardly extending threaded bosses on said flanges; threaded calks removably secured in said bosses; and a securing strap passed through said openings and adapted to secure said side members in position, substantially as described.

In testimony whereof I have signed my name to this specification in the presence of two subscribing witnesses.

ANDREW J. SANGSTER.

Witnesses:
HELEN F. LILLIS,
JOSHUA R. H. POTTS.